(12) United States Patent
De Flaviis et al.

(10) Patent No.: US 8,954,011 B2
(45) Date of Patent: Feb. 10, 2015

(54) METHOD AND SYSTEM FOR A WIRELESS INTEGRATED TEST AND MEASUREMENT DEVICE

(75) Inventors: Franco De Flaviis, Irvine, CA (US); Thomas Baker, Dana Point, CA (US)

(73) Assignee: Broadcom Corporation, Irvine, CA (US)

( * ) Notice: Subject to any disclaimer, the term of this patent is extended or adjusted under 35 U.S.C. 154(b) by 493 days.

(21) Appl. No.: 12/845,561

(22) Filed: Jul. 28, 2010

(65) Prior Publication Data

US 2011/0207412 A1 Aug. 25, 2011

Related U.S. Application Data

(60) Provisional application No. 61/306,334, filed on Feb. 19, 2010, provisional application No. 61/360,788, filed on Jul. 1, 2010.

(51) Int. Cl.
*H04B 17/00* (2006.01)

(52) U.S. Cl.
CPC ........ *H04B 17/0057* (2013.01); *H04B 17/0007* (2013.01)
USPC .................. 455/67.11; 455/67.14; 455/226.1; 455/226.2; 455/226.3; 455/226.4

(58) Field of Classification Search
USPC ....................................................... 455/67.14
See application file for complete search history.

(56) References Cited

U.S. PATENT DOCUMENTS

| | | | |
|---|---|---|---|
| 6,515,609 B1 * | 2/2003 | Moulsley | 341/155 |
| 6,944,427 B2 | 9/2005 | Haub et al. | 455/63.1 |
| 7,177,663 B2 | 2/2007 | Axness et al. | 455/552.1 |
| 7,792,502 B2 | 9/2010 | Baker | 455/115.2 |
| 8,000,656 B1 * | 8/2011 | Jiao et al. | 455/67.11 |
| 2003/0064683 A1 * | 4/2003 | Matthews et al. | 455/67.1 |
| 2004/0171408 A1 | 9/2004 | Maruta | 455/562.1 |
| 2005/0176375 A1 * | 8/2005 | Bednasz et al. | 455/67.12 |
| 2005/0254430 A1 * | 11/2005 | Clark et al. | 370/241 |
| 2006/0125599 A1 * | 6/2006 | Ghabra et al. | 340/5.61 |
| 2007/0066259 A1 * | 3/2007 | Ryan et al. | 455/234.1 |
| 2007/0281760 A1 * | 12/2007 | Nikitin et al. | 455/575.2 |
| 2008/0232448 A1 * | 9/2008 | Baker | 375/219 |
| 2008/0233881 A1 * | 9/2008 | Baker | 455/42 |
| 2010/0304770 A1 * | 12/2010 | Wietfeldt et al. | 455/509 |

FOREIGN PATENT DOCUMENTS

WO WO 0251045 A1 * 6/2002 ............ H04B 17/00

* cited by examiner

*Primary Examiner* — Wesley Kim
*Assistant Examiner* — Devan Sandiford
(74) *Attorney, Agent, or Firm* — Brinks Gilson & Lione

(57) ABSTRACT

Aspects of a method and system for a wireless integrated power test and measurement are provided. In this regard, concurrently with receiving a first signal via a first antenna, a second signal that indicates received signal strength of the first signal may be generated and transmitted via a second antenna. The second signal may be utilized to determine performance of the first antenna. A frequency of the generated second signal may be controlled so as to mitigate interference between the transmitted second signal and the received first signal. The first signal may be formatted in accordance with one or more first wireless standards and the second signal may be formatted in accordance with one or more second wireless standards. The received signal strength of the first signal may be determined via an analog-to-digital converter and the second signal may be updated at the sample rate of the analog-to-digital converter.

20 Claims, 6 Drawing Sheets

- PRIOR ART -

METHOD AND SYSTEM FOR A WIRELESS INTEGRATED TEST AND MEASUREMENT DEVICE

CLAIM OF PRIORITY

This patent application makes reference to, claims priority to and claims benefit from U.S. Provisional Patent Application Ser. No. 61/306,334 filed on Feb. 19, 2010 and U.S. Provisional Patent Application Ser. No. 61/360,788 filed on Jul. 1, 2010.

The above stated application is hereby incorporated herein by reference in its entirety.

FIELD OF THE INVENTION

Certain embodiments of the invention relate to signal measurement. More specifically, certain embodiments of the invention relate to a method and system for an wireless integrated test and measurement device.

BACKGROUND OF THE INVENTION

With the increasing popularity of various wireless standards and technologies, there is a growing demand to provide a simple and complete solution for wireless communications applications. In this regard, electronics manufacturers are increasingly attempting to integrate multiple wireless technologies into wireless equipment such as laptops and handsets.

Although such integration may be desirable to users, incorporating multiple wireless communication technologies into a single device poses a variety of problems in terms of cost and complexity. One problem in particular is that the smaller antennas in such devices, combined with the widely different frequencies attempting to be received via these antennas, makes design and test of the antennas quite a challenge. In this regard, as antennas become smaller and smaller compared to the wavelength of the signals they are receiving, measuring the performance of the antenna becomes increasingly troublesome because conventional equipment used to measure the antenna itself acts as an antenna.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an integrated wireless power meter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a wireless integrated test and measurement device. In various embodiments of the invention, as a first signal is being received via a first antenna, a second signal that indicates received signal strength of the first signal may be generated and transmitted via a second antenna. The second signal may be utilized to determine performance of the first antenna. A frequency of the generated second signal may be controlled so as to mitigate interference between the transmitted second signal and the received first signal. The first signal may be formatted in accordance with one or more first wireless standards and the second signal may be formatted in accordance with one or more second wireless standards. The one or more second wireless standards may be selected based on characteristics of the first signal. The received signal strength of the first signal may be determined via an analog-to-digital converter and the second signal may be updated at the sample rate of the analog-to-digital converter. One or more of an analog-to-digital converter, a matching network, and a power amplifier may be configured based on the characteristics of the first signal. The second signal may indicate instantaneous and/or time-averaged power of the first signal. The second signal may indicate a frequency of the first signal. The first signal may be, for example, an FM radio signal and the second signal may, for example, be a Bluetooth signal.

Figure 1:
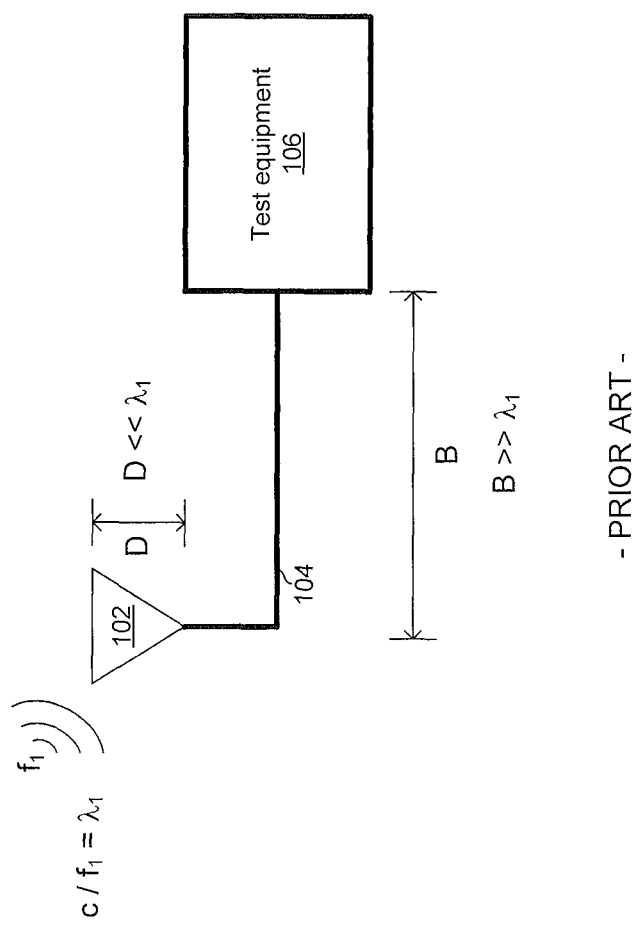
FIG. 1 is a diagram illustrating a conventional measurement of antenna performance, in connection with an embodiment of the invention.

FIG. 1 is a diagram illustrating a conventional measurement of antenna performance, in connection with an embodiment of the invention. Referring to FIG. 1 there is shown an antenna under test (AUT) 102, test equipment 106, and a cable 104 that couples the AUT 102 to the test equipment 106.

The antenna under test (AUT) 102 may comprise any type and/or geometry of antenna, such as a wire antenna, loop antenna, antenna array, monopole antenna, dipole antenna, and/or microstrip or stripline patch. The test equipment 106 may comprise any type of test or measurement equipment such as a power meter, a spectrum analyzer, a network analyzer, or an oscilloscope. The cable 104 may comprise any type of conductor such as coaxial cable or twisted pair wiring.

In the conventional test setup shown in FIG. 1, utilizing the test equipment 106 to measure the performance of the AUT 102 may be challenging because the cable 104 as well as the test equipment 106 may act as an antenna and, thus, it may be difficult to determine which portion of the received signal was received via the AUT 102 and which portion was received via the cable 104. Also, the cable 104 may load and/or otherwise affect the AUT 102 such that performance of the AUT 102 while connected to the test equipment 106 may be substantially different than the performance of the AUT 102 when it is installed in, for example, a cell phone, laptop, or other wireless device.

Figure 2:
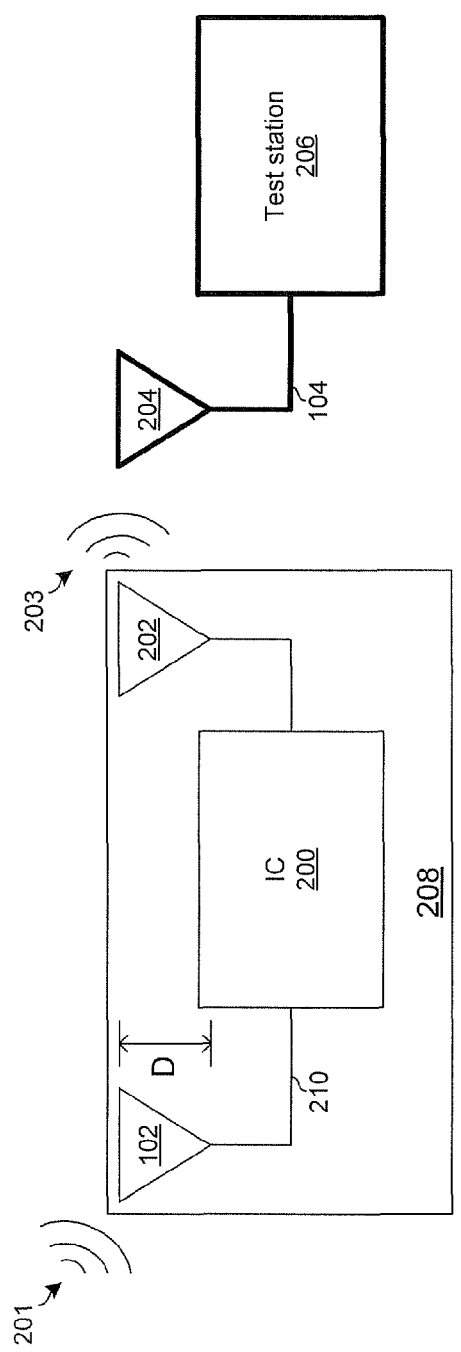
FIG. 2 is a diagram illustrating measurement of antenna performance via a wireless integrated test and measurement device, in accordance with an embodiment of the invention.

FIG. 2 is a diagram illustrating measurement of antenna performance via a wireless integrated test and measurement device, in accordance with an embodiment of the invention. Referring to FIG. 2, there is shown the AUT 102 installed and/or built into a wireless device 208 comprising an integrated circuit 200 and a second antenna 202.

The test station 206 may comprise suitable logic, circuitry, interfaces, and/or code that may be operable to receive signals utilizing one or more wireless protocols and/or standards and process information contained in the received signals. For example, the test station 206 may comprise a personal computer operable to communicate, via the antenna 204, utilizing, for example, Bluetooth, the IEEE 802.11 family of standards ("Wi-Fi"), infrared, cellular and/or other wireless protocols and/or standards. The wireless protocol(s) and/or standard(s) utilized by the test station 206 may be different than the wireless protocol(s) and/or standard(s) utilized for communication via the AUT 102.

The test station 206 may also comprise suitable logic, circuitry, interfaces, and/or code that may be operable to transmit control signals and/or information to the wireless device 208. Such control signals and/or information may enable configuring the device 208. In this manner, communications between the test station 206 and the device 208 via the antennas 204 and 202 may replace wired communications, such as serial port communications, that may conventionally be utilized for such control and/or configuration of a device under test. In various embodiments of the invention, the test station 206 may send control signals and/or information that may configure the IC 200 into a known and/or particular state—into a test mode, for example. In various embodiments of the invention, the test station 206 may send control signals and/or information that may set the frequency at which the IC 200 transmits and/or receives via the AUT 102, set the frequency at which the IC 200 transmits and/or receives via the antenna 202, set gain levels in the IC 200, and/or set bias voltages in the IC 200.

The device 208 may comprise any wireless device such as a mobile handset, a laptop computer or netbook, or a personal media player, and may comprise an integrated circuit (IC) 200. The IC 200 may be a "chip" and comprise one or more metal layers on a semiconductor substrate and may be fabricated utilizing bipolar junction transistor (BJT), n-channel metal on silicon (NMOS), complementary metal on silicon (CMOS), a combination of bipolar and CMOS (Bi—CMOS), or any other integrated circuit technology. The IC 200 may comprise suitable logic, circuitry, interfaces, and/or code that may be operable to determine strength and/or other characteristics, such as frequency, of signals received via the AUT 102. In this regard, the IC 200 may be operable to perform functions similar to or the same as functions performed by the test equipment 106 described with respect to FIG. 1. For example, the IC 200 may be operable to determine characteristics of signals received via the AUT 102. Exemplary characteristics of the signals received via the AUT 102 may comprise signal strength, frequency, phase, signal to noise ratio (SNR), signal to interference noise ratio (SINR), and carrier to noise ratio (CNR), carrier to interference noise ratio (CINR).

The IC 200 may also comprise suitable logic, circuitry, interfaces, and/or code that may be operable to wirelessly communicate the determined signal characteristics to the test station 206. In this regard, the IC 200 may be operable to generate signals that carry measured signal characteristics, and to transmit such signals via the second antenna 202. Additionally, the IC 200 may be operable to receive control signals via the second antenna 202. The IC 200 may utilize, for example, Bluetooth, Wi-Fi, infrared, cellular and/or other wireless protocols and/or standards for communicating determined characteristics via the second antenna 202. The wireless protocol(s) and/or standard(s) utilized for communication via the second antenna 202 may be different than the wireless protocol(s) and/or standard(s) utilized for communication via the AUT 102.

In an exemplary embodiment of the invention, the IC 200 and antenna under test (AUT) 102 may be mounted on a printed circuit board (PCB) which may comprise, for example, one or more layers of copper and one or more layers of insulating material such as Duroid or FR-4. In such an embodiment of the invention, the conductor 210 that connects the AUT 102 to the IC 200 may comprise, for example, an etched copper trace. In another exemplary embodiment of the invention, the AUT 102 may be integrated on-chip. That is, the AUT 102 may be realized in one or more metal layers on the semiconductor substrate. In such an embodiment, the conductor 210 may comprise one or more traces in one or more metal layers of the IC 200. In another exemplary embodiment of the invention, the AUT 102 may be realized within and/or on a package of the IC 200. In such instances, the conductor 210 may comprise a bond wire.

In operation, a signal 201 may be received via the AUT 102 and conveyed to the IC 200 via the conductor 210. The IC 200 may determine characteristics of the received signal 201. For example, the IC 200 may determine characteristics, such as power, of the signal 201. The IC 200 may then generate one or more messages (e.g., one or more Bluetooth packets) that convey the determined characteristics. The IC 200 may then transmit the generated one or more messages via the second antenna 202. The messages may be communicated as signal 203. In an exemplary embodiment of the invention, the signal 203 may be streamed and/or transmitted real-time such that as a signal 201 is received, a corresponding signal 203 is concurrently transmitted. In another exemplary embodiment of the invention, a signal 201 may be received for a period of time and the characterization for that time period may be burst transmitted as a corresponding signal 203.

The frequency, encoding, modulation, and/or other characteristics of the signal 203 may be controlled or selected to minimize the impact that the transmission of signal 203 has on the reception of signal 201. In this regard, the signal 201 may have a carrier frequency or center frequency of $f_1$ and the signal may have a carrier frequency or center frequency of $f_2$, where $f_2$ is selected to be different than $f_1$ such that there is minimal or acceptable interference from signals 203 at the AUT 102. Also, the signal 201 may be generated and/or transmitted in accordance with one or more first protocols and/or standards and the signal 203 may be generated and/or transmitted in accordance with one or more second protocols and/or standards. For example, the signal 201 may comprise, for example, a FM radio signal or DVB-H signal and the signal 203 may be transmitted in accordance with, for example, Bluetooth, Wi-Fi, infrared, cellular and/or other wireless protocols and/or standards. Also, to reduce the reception of signals 203 at the AUT 102, the second antenna 202 and/or the AUT 102 may have radiation patterns directed away from each other.

The test station 206 may receive and process the signal 203 to recover the determined characteristics of the signal 201. The test station 206 may utilize the characteristics of the signal 201 to determine the performance of the AUT 102. For example, based on received signal strength of the signal 201 over a range of frequencies, the test station 206 may determine how to configure the AUT 102 and/or associated circuitry such as a matching network and/or power amplifier. The determined configuration information may be then programmed into and/or utilized to configure the device 208 and/or the IC 200.

Figure 3:
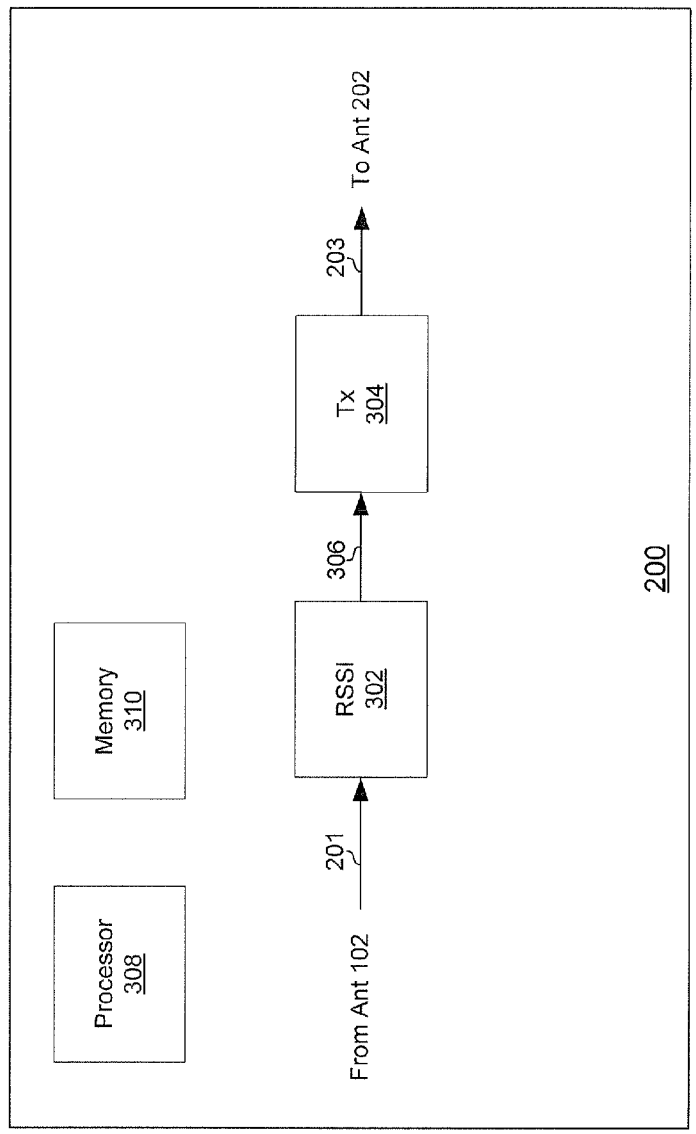
FIG. 3 is a diagram illustrating an exemplary integrated circuit comprising wireless test and measurement functionality, in accordance with an embodiment of the invention.

FIG. 3 is a diagram illustrating an exemplary integrated circuit comprising wireless test and measurement functionality, in accordance with an embodiment of the invention. Referring to FIG. 3, there is shown the IC 200 comprising a received signal strength indicator (RSSI) 302, a transmitter 304, a processor 308, and a memory 310. In various embodiments of the invention, the IC 200 may comprise additional components, but such components are omitted from the figure for simplicity of illustration.

The processor 308 and the memory 310 may comprise suitable logic, circuitry, interfaces and/or code that may enable processing data and/or controlling operations of the IC 200. The memory 310 may comprise, for example, SRAM, DRAM, and/or non-volatile memory that stores data and/or instructions. The processor 308, utilizing the memory 310, may be operable to execute code to effectuate operation of the IC 200. For example, the processor 308 may execute code stored in the memory 310 to configure and/or control the RSSI 302 and/or the transmitter 203.

The RSSI 302 may comprise suitable logic, circuitry, interfaces, and/or code that may be operable to measure the strength of the received signal and generate a representation of the measured signal strength. In an exemplary embodiment of the invention, the RSSI 302 may comprise an analog-to-digital converter (ADC).

The transmitter 304 may comprise suitable logic, circuitry, interfaces, and/or code that may be operable to receive a signal strength indication 306 and transmit the indication utilizing one or more wireless protocols and/or standards such as Bluetooth, Wi-Fi, or Infrared. In some embodiments of the invention, the transmitter 304 may modulate a carrier signal by the indication 304. In some embodiments of the invention, the transmitter 304 may packetize the indication 304 in accordance with the wireless protocols and/or standards in use and/or perform other associated processing to transmit the packets in accordance with the wireless protocols and/or standards. The transmitter 304 may support a plurality of wireless protocols and/or standards and may be configurable to select among the protocols and/or standards.

In operation, signals from the AUT 102 may be conveyed to the RSSI 302 and the indication 306 output by the RSSI 302 may be communicated to the transmitter 304 which may communicate the indication 306 in the form of signal 203. For example, the transmitter 304 may comprise a Bluetooth transmitter, may generate one or more Bluetooth packets comprising the indication 306, and may generate the Bluetooth packets as signal 203.

Figure 4A:
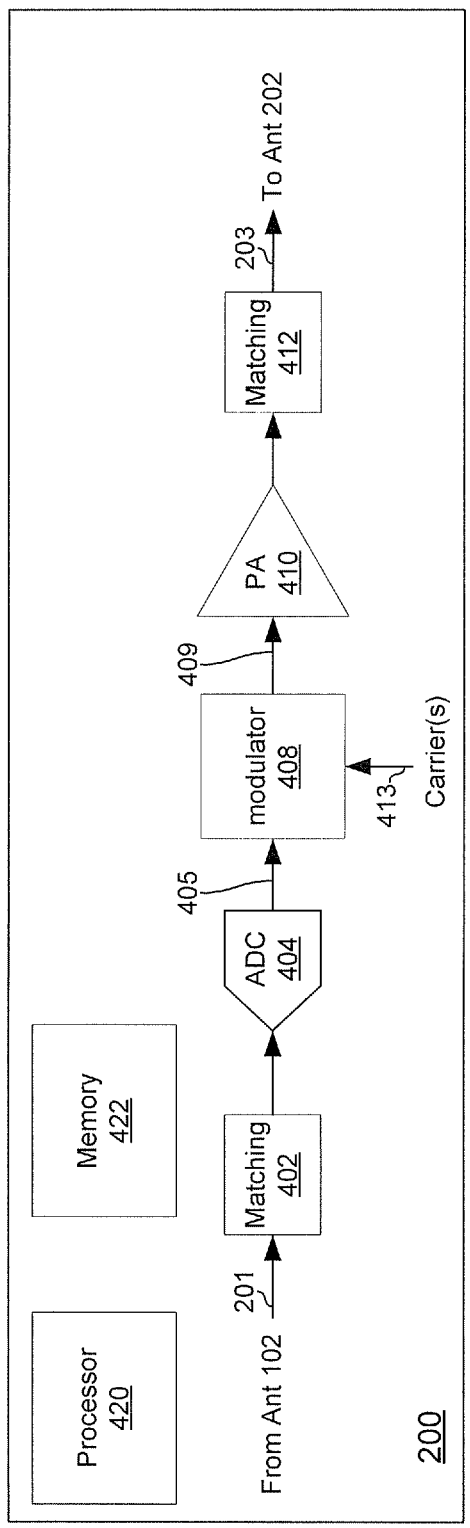
FIG. 4A is a diagram illustrating an exemplary integrated circuit comprising wireless test and measurement functionality, in accordance with an embodiment of the invention.

FIG. 4A is a diagram illustrating an exemplary integrated circuit comprising wireless test and measurement functionality, in accordance with an embodiment of the invention. Referring to FIG. 4A, there is shown the IC 200 comprising processor 420, memory 422, matching networks 402 and 412, ADC 404, modulator 408, and a power amplifier (PA) 410. In various embodiments of the invention, the IC 200 will comprise additional components, but such components are omitted from the figure for simplicity of illustration.

The processor 420 and the memory 422 may comprise suitable logic, circuitry, interfaces and/or code that may enable processing data and/or controlling operations of the IC 200. The memory 422 may comprise, for example, SRAM, DRAM, and/or non-volatile memory that stores data and/or instructions. The processor 308, utilizing the memory 422, may be operable to execute code to effectuate operation of the IC 200. For example, the processor 420 may execute code stored in the memory 422 to configure and/or control the matching networks 402 and 412, the ADC 404, the modulator 408, and/or the power amplifier (PA) 410.

The matching network 402 may comprise suitable logic, circuitry, interfaces, and/or code that may be operable match the impedance of the AUT 102 to the impedance of the IC 200. The matching network 412 may comprise suitable logic, circuitry, interfaces, and/or code that may be operable match the impedance of the IC 200 to the impedance of the second antenna 202. The matching networks 402 and 412 may be configurable via, for example, one or more control signals from the RSSI and/or from one or more processors. The matching networks 402 and 412 may be configured based on, for example, characteristics of received signals 201 and characteristics of the transmitted signals 203, respectively. In some instances, one or both of the matching networks 402 and 412 may be unnecessary. For example, the matching network 402 may be eliminated in order to achieve the highest possible voltage swing at the input to the ADC 404.

The ADC 404 may comprise suitable logic, circuitry, interfaces, and/or code operable to convert an analog signal to a digital representation. The range and/or resolution of the ADC 404 may be configurable via, for example, feedback and/or one or more control signals from one or more processors. The ADC 404 may be configured based on, for example, characteristics of the AUT 102, characteristics of the received signals 201, and/or characteristics of the transmitted signals 203.

The modulator 408 may comprise suitable logic, circuitry, interfaces, and/or code that may be operable to impress the output 405 of the ADC 404 onto one or more carrier signals 413. The modulator 408 may be operable to perform, for example, frequency modulation, phase modulation, amplitude modulation, or some combination thereof. The modulation performed by the modulator 408 may be determined by the wireless standard(s) and/or protocol(s) in use.

The PA 410 may be operable to increase the power of the output of the modulator 408 such that the signal 203 is strong enough to be transmitted via the second antenna 202 and be received at a destination device. The gain of the PA 410 may be adjustable. In some instances, the PA 410 may be unnecessary.

In operation, a signal 201 from the AUT 102 may be conveyed via the impedance matching network 402 to the ADC 404. The output 405 of the ADC 404 may be indicative of the strength of the signal 201. The modulator 408 may modulate one or more carriers 413 by the output 405 of the ADC 404, where the modulation may be in accordance with one or more wireless protocols and/or standards. The output 409 of the modulator 408 may be amplified by the PA 410 for transmission via the matching network 412 and the second antenna 202.

In various embodiments of the invention, the matching network 402 and/or the ADC 404 may perform a filtering function on the signal 201. For example, the signal 201 may be low-pass filtered and/or passed through an envelope detector. Alternatively a filter (not shown) may be present in the signal path prior to the ADC 404. Furthermore, filtering performed by the matching network 402, the ADC 404, or a filter (not shown) may be configurable based on, for example, feedback and/or characteristics of the signal 201.

Figure 4B:
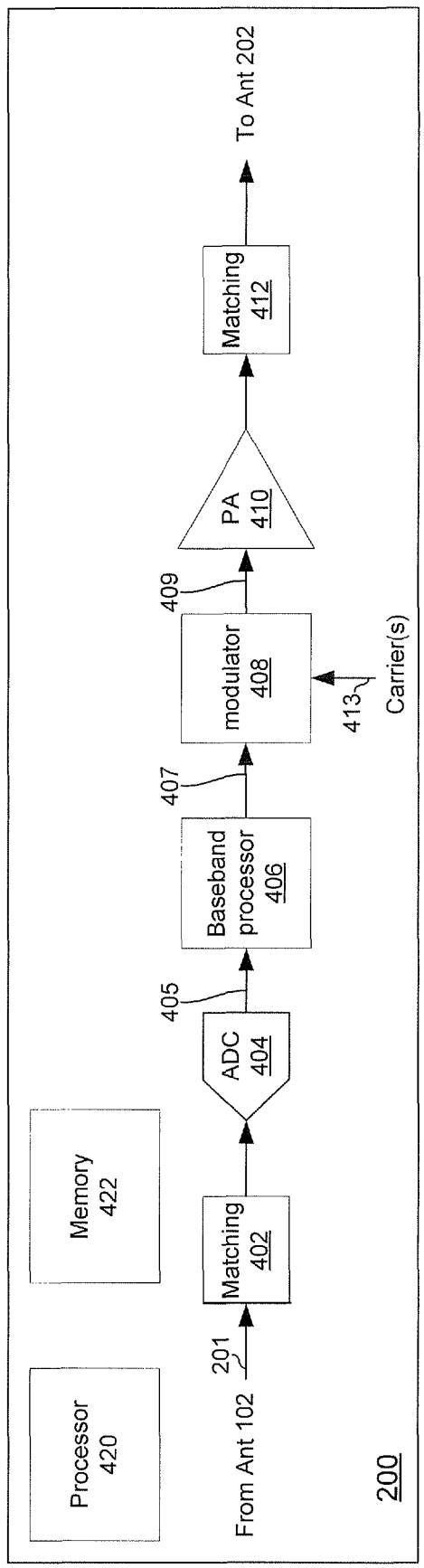
FIG. 4B is a diagram illustrating an exemplary integrated circuit comprising wireless test and measurement functionality, in accordance with an embodiment of the invention.

FIG. 4B is a diagram illustrating an exemplary integrated circuit comprising wireless test and measurement functionality, in accordance with an embodiment of the invention.

Referring to FIG. 4B, the IC 200 is substantially as described with respect to FIG. 4A, but additionally comprises a baseband processor 406.

The baseband processor 406 may comprise suitable logic, circuitry, interfaces, and/or code that may be operable to process and/or generate baseband signals. In this regard, the baseband processor 406 may be operable to process signals received from the ADC 404 and generate corresponding signals to be transferred to the modulator 408. The baseband processor 406 may also be operable to perform functions such as a Fast Fourier Transform (FFT) for characterizing received signals. The baseband processor 406 may also be operable to provide control and/or feedback signals to configure one or more of the matching networks 402, the matching network 412, the ADC 404, and the PA 410. The control signals may be based on, for example, characteristics of one or more of the signals 405, 407, 409, and 413.

In operation, a signal 201 from the AUT 102 may be conveyed via the impedance matching network 402 to an analog-to-digital converter (ADC) 404. The output 405 of the ADC 404 may be indicative of the strength of the signal 201. The output 405 of the ADC 404 may undergo baseband processing, such as encoding and/or packetization in accordance with one or more wireless protocols and/or standards, in the baseband processor 406. The modulator 408 may modulate the output of the baseband processor 406 onto one or more carrier signals 413 in accordance with one or more wireless protocols and/or standards. The output of the modulator 406 may be amplified by the PA 410 for transmission via the matching network 412 and the second antenna 202.

Figure 5:
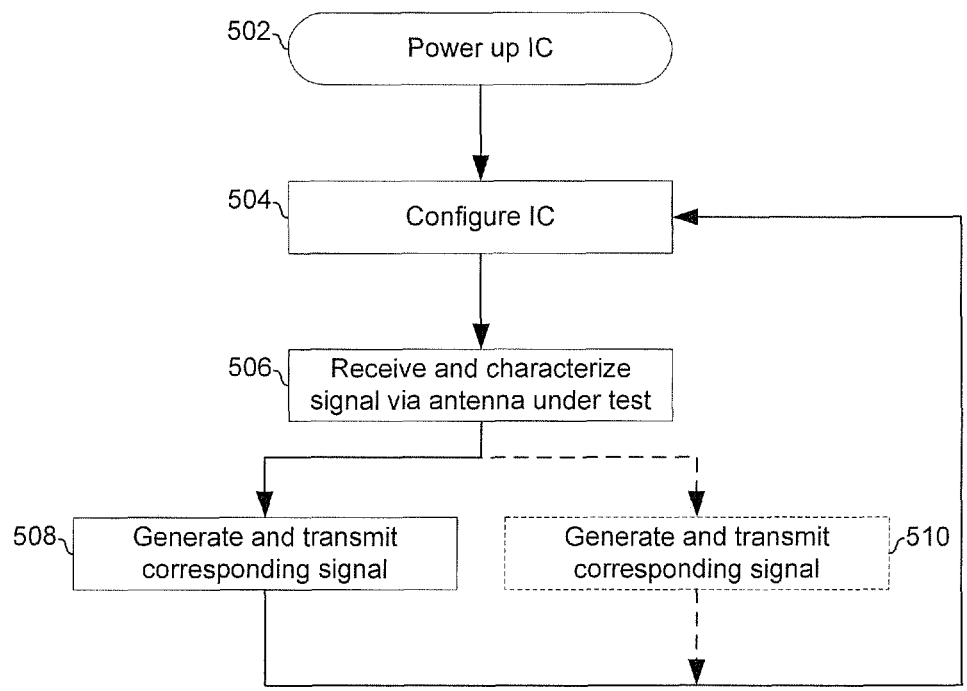
FIG. 5 is a flow chart illustrating exemplary steps for antenna characterization and measurement, in accordance with an embodiment of the invention.

FIG. 5 is a flow chart illustrating exemplary steps for antenna characterization and measurement, in accordance with an embodiment of the invention. Referring to FIG. 5, the exemplary steps may begin with step 502 when the IC 200 is powered up. Subsequent to step 502, the exemplary steps may advance to step 504.

In step 504, the IC 200 may be configured based on, for example, characteristics of the AUT 102, characteristics of received signals 201 to be received, and/or characteristics of signals 203 to be transmitted. Subsequent to step 504, the exemplary steps may advance to step 506.

In step 506, the IC 200 may begin receiving and characterizing a signal 201 via the AUT 102. In an exemplary embodiment of the invention, each characterization of the signal 201 generated and transmitted by the IC 200 may correspond to a single sample of the signal 201 or multiple samples of the signal 201. In instances that each characterization corresponds to multiple samples of the signal 201, the multiple samples may be averaged, weighted, or otherwise processed. For example, the IC 200 may determine instantaneous and/or time-averaged power of the signal 201. Subsequent to step 506, the exemplary steps may advance to step 508.

In step 508, the IC 200 may generate and transmit a signal 203 containing the characterization determined in step 506. Characteristics of the signal 203, such as frequency, encoding, modulation, and/or direction of propagation, may be controlled such that the signal 203 interferes with the signal 201 as little as possible.

In some embodiments of the invention, the step 510 may occur in parallel with or concurrently with step 508. In step 510, various components of the IC 200 may be configured based on results of the characterization performed in step 506. For example, the range or resolution of the ADC 404 may be adjusted and/or the impedance of the matching network 402 may be adjusted.

Aspects of a method and system for an integrated wireless test and measurement are provided. In an exemplary embodiment of the invention, as a first signal 201 is being received via a first antenna 102, a second signal 203 that indicates strength of the first signal 201 may be concurrently generated and transmitted via a second antenna 202. The second signal 203 may be utilized to determine performance of the first antenna 102. The first signal 201 may be formatted in accordance with a first one or more wireless standards and the second signal 203 may be formatted in accordance with a second one or more wireless standards. The second one or more wireless standards may be selected based on characteristics of the first signal 201. The received signal strength of the signal 201 may be determined via an analog-to-digital converter 404 and the second signal 203 may be updated at the sample rate of the analog-to-digital converter 404. One or more of an analog-to-digital converter 404, a matching network 402 and/or 412, and a power amplifier 410 may be configured based on characteristics of the first signal 201. The second signal 203 may indicate instantaneous and/or time-averaged power of the first signal 201. The second signal 203 may indicate a frequency of the first signal 201. The first signal 201 may be, for example, an FM radio signal and the second signal 203 may, for example, be a Bluetooth signal.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for wireless power meter and measurement.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal measurement, the method comprising:
   in a wireless communication device:
   receiving a first signal via a first antenna at said wireless communication device during a test duration, the first signal being modulated according to a first communication protocol;
   during the test duration when the first antenna is under test, measuring a received signal strength of the received first signal at said wireless communication device;
   in response to the measured received signal strength, generating a characterization signal;
   concurrently with receiving said first signal via said first antenna during said test duration, modulating a second signal with the characterization signal so that the second signal indicates said measured received signal strength of said first signal, including
   determining a frequency of the received first signal, and
   selecting a frequency of said generated second signal so as to mitigate interference with said received first signal such that there is minimal or acceptable interference of the generated second signal from the received first signal, and
   modulating the generated second signal according to a second communication protocol, the second communication protocol being selected to be different from the first communication protocol; and
   concurrently with receiving said first signal via said first antenna during said test duration, transmitting said generated second signal via a second antenna during the test duration.

2. The method according to claim 1, wherein transmitting said generated second signal comprises:
   transmitting the generated second signal in real time such that, as the first signal is received at an input, the second antenna concurrently transmits the second signal.

3. The method according to claim 1, wherein said first signal is formatted in accordance with one or more first wireless standards and said second signal is formatted in accordance with a second wireless standard, the second wireless standard chosen to mitigate interference between the second signal and the first signal.

4. The method according to claim 3, wherein generating a second signal that indicates said measured received signal strength of said first signal comprises generating one or more Bluetooth packets that convey the measured received signal strength of the first signal.

5. The method according to claim 1, comprising:
   determining said received signal strength of said first signal via an analog-to-digital converter which samples the first signal;
   generating the characterization signal using a single sample of the first signal by the analog-to-digital converter; and
   updating said second signal at the sample rate of said analog-to-digital converter.

6. The method according to claim 5, comprising configuring one or more of the analog-to-digital converter, a matching network, and a power amplifier based on characteristics of said first signal.

7. The method according to claim 5, comprising:
   processing the single sample of the first signal to determine an instantaneous power of the first signal; and
   producing the characterization signal with a value indicative of the instantaneous power of said first signal.

8. The method according to claim 5, comprising:
   in the analog-to-digital converter, sampling the first signal so that each characterization signal corresponds to a plurality of samples of the first signal;
   processing the plurality of samples of the first signal to determine a time-averaged power of the first signal and to produce the characterization signal with a value indicative of the time-averaged power of said first signal.

9. The method according to claim 5, further comprising:
   initially, selecting a range or a resolution of the analog-to-digital converter; and
   subsequently, using the generated characterization signal to update the range or the resolution of the analog-to digital converter.

10. The method according to claim 9, wherein the range or resolution of the analog-to-digital converter is selected using characteristics of the first antenna.

11. A wireless communication device comprising:
    a first antenna configured to receive a first signal during a test duration, the first signal being modulated according to a first communication protocol;
    a received signal strength indicator configured to measure a received signal strength of the received first signal at said wireless communication device during the test duration when the first antenna is under test;
    a baseband processor responsive to the measured received signal strength to generate a characterization signal;
    circuitry configured to modulate a second signal with the characterization signal concurrently with receiving said first signal via said first antenna during said test duration so that the second signal indicates said measured received signal strength of said first signal, including
    by the baseband processor, determining a frequency of the received first signal, and
    by the baseband processor, selecting a frequency of said generated second signal so as to mitigate interference with said received first signal such that there is minimal or acceptable interference of the generated second signal from the received first signal, and
    by a modulator, modulating the generated second signal according to a second communication protocol, the second communication protocol being selected to be different from the first communication protocol; and
    concurrently with receiving said first signal via said first antenna during said test duration, transmitting by the wireless communication device said generated second signal via a second antenna during the test duration.

12. The wireless communication device according to claim 11, wherein the wireless communication device is further configured for transmitting the generated second signal in real time such that, as the first signal is received at an input, the second antenna concurrently transmits the second signal.

13. The wireless communication device according to claim 11, wherein said first signal is formatted in accordance with one or more first wireless standards and said second signal is formatted in accordance with a second wireless standard, the second wireless standard chosen to mitigate interference between the second signal and the first signal.

14. The wireless communication device according to claim 13, further comprising a transmitter configured to generate one or more Bluetooth packets that convey the measured received signal strength of the first signal.

15. The wireless communication device according to claim 11, comprising:
    the received signal strength indicator is configured to determine said received signal strength of said first signal via an analog-to-digital converter which samples the first signal;

the baseband processor is configured to generate the characterization signal using a single sample of the first signal by the analog-to-digital converter; and the circuitry is configured to update said second signal at the sample rate of said analog-to-digital converter.

16. The wireless communication device according to claim 15, further comprising a processor operative to configure one or more of the analog-to-digital converter, a matching network, and a power amplifier based on characteristics of said first signal.

17. The wireless communication device according to claim 15, comprising:

circuitry configured to process the single sample of the first signal to determine an instantaneous power of the first signal; and wherein the baseband processor is configured to produce the characterization signal with a value indicative of the instantaneous power of said first signal.

18. The wireless communication device according to claim 15, wherein the analog-to-digital converter is configured to sample the first signal so that each characterization signal corresponds to a plurality of samples of the first signal; and further comprising:

circuitry configured to process the plurality of samples of the first signal to determine a time-averaged power of the first signal, the baseband processor operative to produce the characterization signal with a value indicative of the time-averaged power of said first signal.

19. The wireless communication device according to claim 15, further comprising:

a processor configured for initially selecting a range or a resolution of the analog-to-digital converter; and subsequently, using the generated characterization signal to update the range or the resolution of the analog-to digital converter.

20. The wireless communication device according to claim 19, wherein the processor is configured to select the range or resolution of the analog-to-digital converter using characteristics of the first antenna.

* * * * *